US010272392B2

(12) United States Patent
Chu et al.

(10) Patent No.: US 10,272,392 B2
(45) Date of Patent: Apr. 30, 2019

(54) POROUS GRAPHENE BASED COMPOSITE MEMBRANES FOR NANOFILTRATION, DESALINATION, AND PERVAPORATION

(71) Applicant: The Research Foundation for the State University of New York, Albany, NY (US)

(72) Inventors: Benjamin Chu, San Diego, CA (US); Benjamin S. Hsiao, Setauket, NY (US); Hongyang Ma, East Setauket, NY (US); Zhe Wang, Stony Brook, NY (US)

( * ) Notice: Subject to any disclaimer, the term of this patent is extended or adjusted under 35 U.S.C. 154(b) by 0 days.

(21) Appl. No.: 16/145,638

(22) Filed: Sep. 28, 2018

(65) Prior Publication Data

US 2019/0030492 A1    Jan. 31, 2019

Related U.S. Application Data

(63) Continuation of application No. 15/325,451, filed as application No. PCT/US2015/040518 on Jul. 15, 2015, now Pat. No. 10,112,150.

(60) Provisional application No. 62/025,549, filed on Jul. 17, 2014.

(51) Int. Cl.

| *B01D 69/12* | (2006.01) |
|---|---|
| *B01D 71/10* | (2006.01) |
| *B01D 71/02* | (2006.01) |
| *B01D 71/40* | (2006.01) |
| *B01D 71/38* | (2006.01) |
| *B01D 69/10* | (2006.01) |
| *B01D 69/02* | (2006.01) |
| *B01D 61/36* | (2006.01) |
| *B01D 61/02* | (2006.01) |

(52) U.S. Cl.
CPC .............. *B01D 69/12* (2013.01); *B01D 69/02* (2013.01); *B01D 69/10* (2013.01); *B01D 71/021* (2013.01); *B01D 71/024* (2013.01); *B01D 71/38* (2013.01); *B01D 71/40* (2013.01); *B01D 61/027* (2013.01); *B01D 61/362* (2013.01); *B01D 2325/02* (2013.01); *Y02A 20/131* (2018.01)

(58) Field of Classification Search
CPC ........ B01D 69/02; B01D 69/10; B01D 69/12; B01D 71/021; B01D 71/024; B01D 71/38; B01D 71/40; B01D 61/362; B01D 61/027; B01D 2325/02; Y02A 20/131
See application file for complete search history.

(56) References Cited

U.S. PATENT DOCUMENTS

| 4,406,749 | A | 9/1983 | Wetzel |
|---|---|---|---|
| 5,421,962 | A | 6/1995 | Shvarts et al. |
| 6,355,144 | B1 | 3/2002 | Weinstein |
| 2008/0149561 | A1 | 6/2008 | Chu et al. |
| 2010/0297502 | A1 | 11/2010 | Zhu et al. |
| 2013/0252101 | A1 | 9/2013 | Zhou et al. |
| 2013/0314844 | A1 | 11/2013 | Chen et al. |
| 2015/0141711 | A1 | 5/2015 | Chu et al. |

OTHER PUBLICATIONS

International Search Report and Written Opinion from Appl. No. PCT/US15/40518 dated Oct. 16, 2015.

*Primary Examiner* — John Kim
(74) *Attorney, Agent, or Firm* — Carter, Deluca & Farrell, LLP

(57) ABSTRACT

Membranes of the present disclosure possess very thin barrier layers, with high selectivity, high throughput, low fouling, and are long lasting. The membranes include graphene and/or graphene oxide barrier layers on a nanofibrous supporting scaffold. Methods for forming these membranes, as well as uses thereof, are also provided. In embodiments, an article of the present disclosure includes a nanofibrous scaffold; at least a first layer of nanoporous graphene, nanoporous graphene oxide, or combinations thereof on at least a portion of a surface of the nanofibrous scaffold; an additive such as crosslinking agents and/or particles on an outer surface of the at least first layer of nanoporous graphene, nanoporous graphene oxide, or combinations thereof.

21 Claims, 2 Drawing Sheets

POROUS GRAPHENE BASED COMPOSITE MEMBRANES FOR NANOFILTRATION, DESALINATION, AND PERVAPORATION

CROSS REFERENCE TO RELATED APPLICATIONS

This application is a continuation of U.S. application Ser. No. 15/325,451, filed Jan. 11, 2017, now U.S. Pat. No. 10,112,150, which is a National Stage of, and claims priority to and the benefit of, International Patent Application No. PCT/US2015/040518 filed on Jul. 15, 2015, which, in turn, claims the benefit of, and priority to, U.S. Provisional Patent Application Ser. No. 62/025,549, filed on Jul. 17, 2014, the entire disclosures of each of which are incorporated by reference herein.

BACKGROUND

Separation processes are important in many industries. Membrane separation technology has been widely adapted in many separation processes due to its broad range of advantages, including lower energy and chemical consumption, and easier operation and maintenance. These processes include water purification, desalination, air filtration/separation, etc.

Membranes utilized in separation processes may have varing configurations, including support layers and barrier layers. Support layers provide the mechanical strength desirable for separation applications. The barrier layer contributes to the primary separation process and determines the separation efficiency of the membrane.

Membranes used for filtration should have certain desirable properties. For example, a greater volume of material to be filtered, sometimes referred to as throughput, is one desirable property. The ability to remove contaminants, sometimes referred to as selectivity, is another desirable property. Reducing the clogging of the membranes, so that the fouling of the membranes is low and requires less frequent cleaning and/or the use of harsh chemicals or processes for cleaning, is yet another desirable property.

Applications of electrospun nanofibrous membranes for liquid filtration have recently been demonstrated for microfiltration, ultrafiltration and nanofiltration. These membranes can effectively increase the permeability of a membrane formed therefrom, while maintaining high rejection ratios.

Improved membranes and methods for forming membranes, as well as uses thereof, remain desirable.

SUMMARY

The present disclosure provides membranes suitable for filtration and similar separation applications. Membranes of the present disclosure possess very thin barrier layers, with high selectivity, high throughput, low fouling, and they are longer lasting. The membranes include (nanoporous) graphene and/or graphene oxide barrier layers on a nanofibrous supporting scaffold. Methods for forming these membranes, as well as uses thereof, are also provided.

In embodiments, an article of the present disclosure includes a nanofibrous scaffold; at least a first layer of nanoporous graphene, nanoporous graphene oxide, or combinations thereof on at least a portion of a surface of the nanofibrous scaffold; an additive such as cross-linking agents and/or particles on an outer surface of the at least first layer of nanoporous graphene, nanoporous graphene oxide, or combinations thereof; and at least a second layer of nanoporous graphene, nanoporous graphene oxide, or combinations thereof on at least a portion of the surface of the first layer of nanoporous graphene, nanoporous graphene oxide, or combinations thereof, such that the additive is between the first and second layers of nanoporous graphene, nanoporous graphene oxide, or combinations thereof.

In other embodiments, an article of the present disclosure includes a nanofibrous scaffold; at least a first layer of nanoporous graphene, nanoporous graphene oxide, or combinations thereof on at least a portion of a surface of the nanofibrous scaffold, the first layer possessing pores having an average diameter from about 1 nm to about 1000 nm; an additive such as cross-linking agents and/or particles on an outer surface of the at least first layer of nanoporous graphene, nanoporous graphene oxide, or combinations thereof; and at least a second layer of nanoporous graphene, nanoporous graphene oxide, or combinations thereof on at least a portion of the surface of the first layer of nanoporous graphene, nanoporous graphene oxide, or combinations thereof, the second layer possessing pores having an average diameter from about 1 nm to about 1000 nm, wherein the additive is between the first and second layers of nanoporous graphene, nanoporous graphene oxide, or combinations thereof.

In embodiments, the nanofibrous scaffold may have a thickness of from about 1 μm to about 500 μm and may have voids possessing a diameter from about 10 nm to about 200 μm.

The first layer, the second layer, or both, may have a thickness from about 10 nm to about 1000 nm.

The first layer, the second layer, or both, may possess pores having an average diameter from about 1 nm to about 1000 nm.

The first layer, the second layer, or both, have a mean surface porosity from about 10% to about 70%.

The spacing between the first layer and the second layer may be from about 0.3 nm to about 100 nm.

Methods for forming articles having these membranes are also provided.

BRIEF DESCRIPTION OF THE DRAWINGS

Various embodiments of the present disclosure will be described herein with reference to the following figures, wherein.

DETAILED DESCRIPTION

Figure 1:
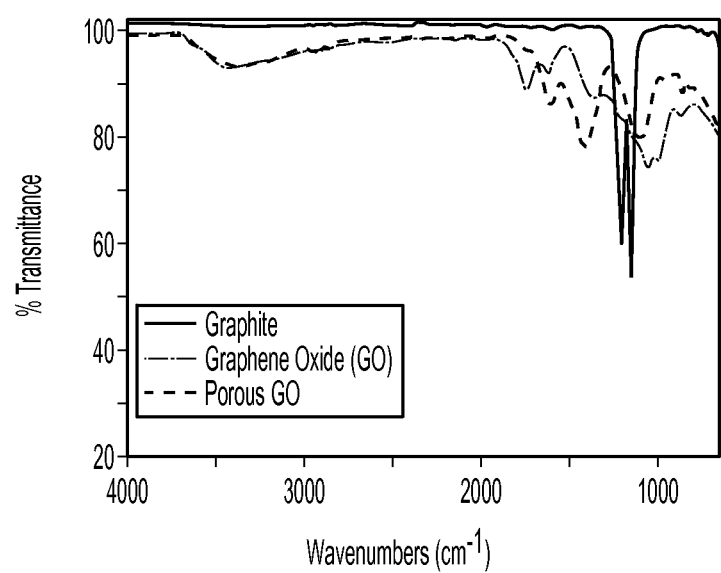
FIG. 1 includes infrared spectra of samples of graphite and graphene oxide produced in accordance with the present disclosure.

For membrane separation technology, preparing very thin barrier layers with high selectivity, high throughput, low fouling, and long lasting properties are important goals. Polymeric materials widely used in membrane separations have not yet been able to achieve such a demanding set of goals.

In accordance with the present disclosure, two-dimensional single atomic layer materials, such as graphene and graphene oxide, especially nanoporous graphene and nanoporous graphene oxide, are utilized to prepare separation membranes that can achieve these goals. In embodiments, chemically modified graphene-based materials may be used as a barrier layer of a membrane possessing a nanofibrous supporting scaffold. These barrier layers can be made: very thin and strong (based on graphene); hydrophilic, by surface functionalization including graphene oxide and its surface modified entities, to obtain low fouling properties; to create two-dimensional (2D) water channels between the graphene sheets, in order to increase the throughput of fluid(s) being filtered, in embodiments water; to shorten the water pathways by increasing the surface porosity, which can be accomplished by using nanoporous graphenes with a high surface porosity; and to seal the edges of graphene sheets with chemical bonding, which also provides the proper spacing between multiple graphene sheets.

As noted above, nanocomposite membranes of the present disclosure include a nanofibrous supporting scaffold. Suitable nanofibrous supporting scaffolds include, for example, structures formed of fibers having a high surface to volume ratio, which may be from about 4 $m^2/m^3$ to about 40 $m^2/m^3$, in embodiments from about 8 $m^2/m^3$ to about 20 $m^2/m^3$. In embodiments, the supporting scaffold may possess a very high specific surface area due to fine nanofibers (having diameters from about 0.1 µm to about 1 µm, in embodiments from about 0.2 µm to about 0.8 µm), and interconnected-pore structures.

The substrates/scaffolds can be formed of any commercially available micro-,ultra-, and/or nano-filtration membranes, and any of the fibrous membranes based on electro-spun nanofibers.

In embodiments, scaffolds may be made of natural and synthetic polymers within the purview of one skilled in the art, including, but not limited to, polyolefins including polyethylene and polypropylene, polysulfones such as polyethersulfone, fluoropolymers such as polyvinylidene fluoride, polyesters including polyethylene terephthalate, polytrimethylene terephthalate, and polybutylene terephthalate, polyamides including nylon 6, nylon 66, and nylon 12, polycarbonates, polystyrenes, polynitriles such as polyacrylonitrile, polyacrylates such as polymethyl methacrylate, polyacetates such as polyvinyl acetate, polyalcohols such as polyvinyl alcohol, polysaccharides (such as chitosan, cellulose, collagen, or gelatin), proteins such as chitin, hyaluronic acid, polyalkylene oxides such as polyethylene oxide and polyethylene glycol, polyurethanes, polyureas, polyvinyl chloride, polyimines such as polyethylene imine, polyvinylpyrrolidone, polyacrylic acids, polymethacrylic acids, polysiloxanes such as polydimethylsiloxane, poly(ester-co-glycol) copolymers, poly(ether-co-amide) copolymers, crosslinked forms thereof, derivatives thereof and copolymers thereof. In some embodiments, poly(acrylonitrile) (PAN), polyethersulfone (PES), polyvinylidenefluoride (PVDF), crosslinked water soluble polymers, e.g., polyvinylalcohol (PVA), modified cellulose and modified chitosan, their chemical derivatives and/or copolymers, may be utilized. Combinations of the foregoing may also be used to form suitable scaffolds.

In some embodiments, it may be desirable to crosslink fluid-soluble polymers to form a nanofibrous scaffold. For example, water-soluble polymers, such as polyvinyl alcohol, polysaccharides (including chitosan and hyaluronan), polyalkylene oxides (including polyethylene oxide), gelatin, and their derivatives may be crosslinked to render these polymers suitable for use as a nanofibrous scaffold. Crosslinking may be conducted using methods within the purview of those skilled in the art, including the use of crosslinking agents. Suitable crosslinking agents include, but are not limited to, $C_2$-$C_8$ dialdehyde, $C_2$-$C_8$ diepoxy, $C_2$-$C_8$ monoaldehydes having an acid functionality, $C_2$-$C_9$ polycarboxylic acids, combinations thereof, and the like. These compounds are capable of reacting with at least two hydroxyl groups of a water-soluble polymer.

Other suitable crosslinking methods include conventional thermal-, radiation- and photo-crosslinking reactions within the purview of those skilled in the art. Two important criteria for the selection of a crosslinking agent or method are as follows: (1) the crosslinking agent or method should not dissolve the nanofibrous scaffold layer; and (2) the crosslinking agent or method should not induce large dimensional change, e.g., hydrophilic electrospun nanofibrous scaffold layers may display very large shrinkage in hydrophobic solvents such as hydrocarbons because of their hydrophilic nature.

Other examples of suitable crosslinking agents which may be utilized in forming a nanofibrous scaffold include, but are not limited to, glutaraldehyde, 1,4-butanediol diglycidyl ether, glyoxal, formaldehyde, glyoxylic acid, oxydisuccinic acid, citric acid, fumaric acid, combinations thereof, and the like. In some embodiments, it may be useful to treat polyvinyl alcohol with a crosslinking agent such as glutaraldehyde.

The amount of crosslinking agent added to the polymer, such as polyvinyl alcohol, may vary from about 0.1 to about 10 percent by weight of the combined weight of the crosslinking agent and polymer, in embodiments from about 0.5 to about 5 percent by weight of the combined weight of the crosslinking agent and polymer.

In forming the nanofibrous scaffold of the present disclosure, the polymer is often first placed in a solvent, such as N,N-dimethyl formamide (DMF), tetrahydrofuran (THF), methylene chloride, dioxane, ethanol, propanol, butanol, chloroform, water, or combinations of these solvents, so that the polymer is present at an amount from about 1 to about 40 percent by weight of the polymer solution, in embodiments from about 3 to about 25 percent by weight of the polymer solution, in embodiments from about 5 to about 15 percent by weight of the polymer solution.

In some embodiments, it may be desirable to add a surfactant or another solvent-miscible liquid to the polymer solution utilized to form the nanofibrous scaffold. The surfactant or other solvent-miscible liquid may lower the surface tension of the solution, which may help stabilize the polymer solution during electro-spinning, electro-blowing, and the like. Suitable surfactants include, for example, octylphenoxypolyethoxy ethanol (commercially available as TRITON X-100), sorbitan monolaurate, sorbitan sesquioleate, glycerol monostearate, polyoxyethylene, polyoxyethylene cetyl ether, dimethyl alkyl amines, methyl dialkyl amines, combinations thereof, and the like. Where utilized, the surfactant may be present in an amount from about 0.001 to about 10 percent by weight of the polymer solution, in embodiments from about 0.05 to about 5 percent by weight of the polymer solution, in embodiments from about 0.1 to about 2 percent by weight of the polymer solution. The solvent miscible fluid with the solvent forms a solvent mixture that can dissolve the polymer but changes the surface tension of the polymer solution and the evaporation rate of the solvent mixture.

In embodiments, the nanofibrous scaffold may be fabricated using electro-spinning, electro-blowing, blowing-assisted electro-spinning, and/or solution blowing technologies. Electro-spinning processes use mainly electric force, but often without the assistance of gas flow. To the contrary, solution blowing processes use only gas flow, without the use of electric force. Blowing-assisted electro-spinning and electro-blowing both use electric force and gas-blowing shear forces. In blowing-assisted electro-spinning processes, the electric force is the dominating factor, while the gas-blowing feature can assist in shearing the fluid jet stream and in controlling the evaporation of the solvent (lower throughput, smaller diameter). In contrast, in electro-blowing processes the gas-blowing force is the dominating factor to achieve the desired spin-draw ratio, while the electric force may enable further elongation of fibers (higher throughput, larger diameter).

The thickness of the nanofibrous scaffold may vary from about 1 µm to about 500 µm, in embodiments from about 10 µm to about 300 µm, in embodiments from about 30 µm to about 150 µm in thickness. In some embodiments, the thickness of the scaffold is from about 40 µm to about 50 µm.

The nanofibrous scaffold possesses pores or voids which assist in the functioning of the membranes of the present disclosure. The diameter of these voids may be from about 10 nm to about 200 µm, in embodiments from about 50 nm to about 30 µm, in embodiments from about 100 nm to about 10 µm. In some embodiments, the pore size may be from about 0.2 µm to about 0.6 µm.

Aside from nanofibers which can be fabricated by electrospinning, nanofibers can also be extracted from natural polysaccharides (e.g., cellulose and chitin). Such polysaccharide nanofibers can have high degrees of crystallinity and are therefore inert over large ranges of pH values. These nanofibers have nominal diameters ranging from a few nanometers to tens of nanometers, essentially overlapping with nanofibers normally fabricated by electro-spinning. These (nano-)fiber suspensions can also be fabricated to form a support layer for the (nanoporous) graphene or graphene oxide barrier layer.

As noted above, in embodiments a membrane of the present disclosure includes a barrier layer of graphene applied to the nanofibrous scaffold. As used herein, graphene includes both graphene and compounds/compositions based upon graphene, including graphene oxide. Graphene is a single layer of carbon atoms with many useful properties. Graphene may be obtained from graphite by mechanical exfoliation, by epitaxial growth, and reduction of either silicon carbide or graphene oxide.

Graphene oxide (hereinafter referred to, in embodiments, as "GO") is an electrically insulating material composed of a single layer of graphite oxide, the reduction precursor of graphene, having oxygen functional groups bonded to the graphene basal-plane. Graphene oxide can be obtained from the exfoliation of graphite oxide. Similar to graphene, GO also possesses one-atom thick sheets with high surface-to-volume ratio and extraordinary physical properties. Compared with graphene, GO possesses functional groups, including hydroxyl, epoxy, and/or carboxylic groups, on both the edge and surface of the two-dimensional plane, which are the result of oxidation reactions. These functional groups may provide more opportunities for further chemical modifications.

For example, poly (vinyl alcohol) (PVA) could be linked to graphene oxide sheets via the reaction between hydroxyl groups of PVA and carboxylic acid groups on GO. The resulting material can be characterized by using solution-phase techniques. The carboxylic acid groups on GO could also react with polyethylene glycol (PEG) to form composites of PEG and GO, which could be employed as drug carriers for cancer treatment and as intracellular imaging probes. The epoxy groups on GO can undergo ring-opening reactions with $NH_2$-terminated ionic liquids (1-(3-aminopropyl)-3-methylimidazolium bromide), with the product being well dispersed in DMF, DMSO, and water. The hydroxyl groups on GO can also be used for chemical modifications. For example, diboronic acid could crosslink the GO sheets by forming bonds with hydroxyl groups on the GO surface to produce a three-dimensional GO framework for hydrogen storage.

Due to oxygen functional groups such as carboxyls, epoxides, and alcohols, GO is hydrophilic and can readily exfoliate as single sheets when ultrasonicated in water. The average size of an individual GO sheet, dispersed in water, may be about 1 $\mu m^2$, with a thickness of from about 1 nm to about 1.5 nm.

GO membranes, having a layer thickness in the submicron range, allow unimpeded permeation of water vapor, but are totally impermeable to other liquid and gas molecules, including helium. This unique behavior may be attributed to the phenomenon of "nanocapillaries" formed between the flakes of GO that make up the GO sheets. In other words, the hydrophilic nature of carboxylic acid groups and hydroxyl groups (which attract water molecules) may create a tortuous network of confined water channels, allowing the transport of water molecules, but preventing the diffusion of larger size and hydrophobic molecules.

Methods for producing graphene oxide, as noted above, are within the purview of those skilled in the art. Graphene oxide is also commercially available, for example, from Graphene Supermarket, Inc. (Calverton, N.Y.).

Graphene-based materials may be desirable for barrier layers because of their single atomic layer structure, which can provide the possibility of making ultra-thin barrier layers from multiple layers of graphene. These thin barrier layers exhibit high flux. It is believed one mechanism by which these graphene-based materials are able to separate contaminants from a fluid stream is the diffusion of the permeate being carried out via the channels between the graphene (or graphene oxide) nanosheets. In other words, the permeate travels through the interlayer spaces built by graphene or graphene oxide layers. Although multiple graphene and graphene oxide nanosheets could build up very thin barrier layers, the permeate still needs to travel a tortuous path between the nano-sheets to arrive at the other end of the membrane, thereby limiting further improvements of membrane efficiency. Thus, the use of nanoporous graphene/graphene oxide can shorten the 2D pathways between the graphene sheets and improve the fluid transport efficiency of a membrane including these materials.

In accordance with the present disclosure, an approach to counter this dilemma has been developed, using graphene or graphene oxide nanosheets with nano-pores on the surface; the assembled barrier layer has more channels (or shorter pathways) than ones built by non-porous layers. The single atomic layer structure of graphene-based materials provides the possibility of fabricating an ultra-thin barrier layer from multiple layers of graphene and/or GO. nanoporous surfaces allow higher permeability. By precisely controlling the parameters during fabrication, the barrier layer thickness and the assembly of the graphene nano-sheets can be well tuned. The resulting separation membranes have higher flux and higher rejection ratios than existing commercial products and are useful in many applications.

Different treatments may be employed to produce and adjust the pore size of nanoporous graphene nanosheets. Small pore sizes can be created by oxidatively etching graphene nanosheets, while graphene dots can be removed by $H_2O_2$ treatment. As a result, nanoscale pores can be generated.

Porous graphenes can also be fabricated by other approaches. One is to use thermal treatment to generate pores on the graphene oxide plane. Heating at 140° C. could facilitate decomposition of graphene oxide, during which carbon dioxide and carbon monoxide would be released from the oxygen-containing sites on graphene oxide. The thermal treatment could be carried out either before or after the assembly of graphene oxide nanosheets. The graphene oxide layers may be heated to from about 130° C. to about 140° C. for a short time, e.g., less than 5 minutes.

Additional approaches to form nanoporous graphenes include the use of ion bombardment together with chemical etching to produce nanopores on a graphene sheet. Single layers of graphene may be irradiated by high density ion beams to generate very small defects. The spots with defects are then oxidized by a chemical agent such as hydrogen peroxide and grow to nanopores. The pore density is dependent on the density of the ion beam, and it could be as high as $10^{12}$ pores per $cm^2$. The pores produced by this method could have sizes less than 1 nm and the pore size distribution is relatively narrow, in embodiments from about 0.5 nm to about 5 nm.

In embodiments, single-layer graphene may be deposited on a grid and irradiated by gallium ions at a density of about $6 \times 10^{12}$ ions/$cm^2$ with 8 kV acceleration voltage and 52° incident angle. Then the graphene can be treated in potassium permanganate (1.875 mM $KMnO_4$ in 6.25% $H_2SO_4$) for 120 minutes. This method can produce nanoporous graphene with relatively low surface porosty.

In embodiments of the present disclosure, electrophoretic deposition can also be used to create nanoporous graphene oxide nanosheets. The electric field could be generated by an applied voltage and the coating materials can be deposited onto a substrate under the influence of an applied electric field.

Electrophoretic deposition is a process where colloidal particles, such as polymers, pigments, dyes, ceramics and metals, suspended in a liquid phase, can be deposited onto an electrode in an electric field. Electrophoretic deposition includes electrophoretic coating, electrophoretic painting, electrocoating, cathodic electrodeposition, and anodic electrodeposition.

Methods and apparatus for electrophoretic deposition are within the purview of one skilled in the art. Electrophoretic deposition means that charged particles (such as for a suspension of colloidal particles having a net surface charge) are moving in response to an applied external electric field (electrophoresis) resulting in the deposition of material onto an electrode. The suspension or colloid is produced by placing the particles of interest, in this case graphene oxide, into a suitable solvent for formation of the suspension or colloid.

Suitable solvents for forming the suspension/colloid include, but are not limited to, water, ethylene glycol, dimethylformamide (DMF), n-methylpyrrolidone (NMP), tetrahydrofuran (THF), combinations thereof, and the like. The graphene oxide may be present in the solution in amounts from about $1 \times 10^{-10}$% by weight of the solution to about 10% by weight of the solution, depending on the mean size of exfoliated graphene oxide sheets, in embodiments from about $5 \times 10^{-8}$% by weight of the solution to about 0.5% by weight of the solution.

The concentration of graphene oxide in the resulting suspension or colloid may be, in embodiments, from about $5 \times 10^{-6}$% to about $5 \times 10^{-2}$%, in embodiments from about $5 \times 10^{-4}$% to about $5 \times 10^{-3}$%. The resulting colloid or suspension is placed in a deposition tank having a working electrode, and counter electrode. Voltage is applied between the working electrode and counter electrode.

Suitable voltages applied to the suspension/colloid in the deposition tank may be from about 1 V to about 300 V, in embodiments from about 10 V to about 100 V, for a period of time from about 10 seconds to about 30 minutes, in embodiments from about 60 seconds to about 10 minutes.

In embodiments, electrophoretic deposition may be used to produce uniform structures having a coating thickness from about 10 nm to about 100 nm, which can be easily controlled by adjusting the coating time and the applied voltage. For example, GO shows negative charge with a zeta potential of −64.7 mV and it could be deposited on indium tin oxide (ITO) electrodes at a voltage of 150 V for a period of time of about 45 seconds.

The resulting layer of nanoporous graphene oxide may have a thickness from about 10 nm to about 1000 nm, in embodiments from about 20 nm to about 500 nm. In some embodiments, the thickness may be from about 10 nm to about 20 nm.

The layer of nanoporous graphene oxide may possess pores having an average diameter from about 1 nm to about 1000 nm, in embodiments from about 5 nm to about 300 nm. In accordance with the present disclosure, the layer of nanoporous graphene oxide may have a mean surface porosity from about 10% to about 70%, in embodiments from about 40% to about 60%.

Deposition of nanoporous graphene/graphene oxide layers on top of polymeric substrates could occur, in embodiments, by vacuum filtration. The nanoporous graphene/graphene oxide sheets may be dispersed into water, with sonication used to facilitate this dispersion. Then, the graphene/graphene oxide suspension (in embodiments, about 5 ppm) may be transferred into a vacuum filtration funnel, below which a polymeric substrate (such as GSWP0.22, commercially available from Millipore) is installed. A vacuum is applied underneath the substrate in order to drive the suspension in the funnel to slowly and evenly flow through the substrate. Since the pore size of the substrate may be smaller than the size of nanoporous graphene/graphene oxide sheets, the graphene/graphene oxide sheets remain on the surface of the substrate. By controlling the concentration of the suspension (from 0.5 ppm to 5 ppm) and the filtration flow rate, the deposition thickness of nanosheets may be controlled.

Spin-coating is another approach for deposition of nanoporous graphene/graphene oxide nano-sheets. Here, a suspension of nanoporous graphene/graphene oxide, in embodiments about 500 ppm, may be prepared before spin-coating. The polymeric substrate may be taped onto the rotating plate of a spin-coating machine. The spinning speed may be set at about 3000 rpm. The suspension may then be dropped onto the center of the spinning substrate. After the droplets spread on the substrate, the above steps may be repeated, for example, about 3 times. The centrifugal force produced by spin-coating and the quick evaporation of water facilitates an ordered assembly of nanoporous graphene/graphene oxide nanosheets.

As noted above, in embodiments, barrier layers may be formed from multiple layers of nanoporous graphene/graphene oxide, with some additional treatment or manipulation to enforce or enhance the mechanical stability of the resulting nanoporous graphene sheets. For example, the nanoporous graphene may be subjected to chemical modifications by the inclusion of additives to adjust (i) the spacings between graphene sheets, and (ii) the seal on the edges of graphene sheets used to stabilize the barrier layer.

In embodiments, enforcing the mechanical stability of assembled nanoporous graphene (or graphene oxide) sheets may occur as follows. The nanoporous graphene (or graphene oxide) sheets may be held together mainly by van der Waals interactions, with the Young's modulus of the film being around 50 GPa. In order to increase the stability and stiffness of the nanoporous graphene (or graphene oxide) layer, but not to substantially expand the inter-sheet spacing, small molecules could be employed as additives to cross-link the nanoporous graphene oxide sheets used to form a barrier layer.

For example, in embodiments, boric acid may be used to form covalent bonds with the oxygen-containing functional groups on graphene oxide and further cross-linked to the nanoporous graphene oxide sheets forming the barrier layer, to improve their mechanical properties. The Young's modulus for graphene oxide film after boric acid cross-linking could be as high as 127 GPa, and the ultimate tensile strength may be increased to 185 GPa. Other functional molecules, such as ethylenediamine, butylenediamine, p-phenylenediamine, glutaraldehyde, epichlorohydrin, phosphorus oxychloride (phosphoryl chloride), trimetaphosphate, linear mixed anhydrides of acetic and di- or tribasic carboxlic acids, vinyl sulfone, diepoxides, cyanuric chloride, aldehydes (for example, formaldehyde, acetaldehyde, acrolein), 1,4-butanediol diglycidyl ether, glyoxal, glyoxylic acid, oxydisuccinic acid, citric acid, fumaric acid, combinations thereof, and the like, could also serve as cross-linkers, depending on the spacing needs. Use of these cross-linking agents results, in embodiments, in the formation of channels between the graphene/graphene oxide sheets that are just wide enough to permit water molecules to pass through.

Where used, cross-linking agents may be in solution including suitable solvents such as water, ethylene glycol, dimethylformamide (DMF), n-methylpyrrolidone (NMP), tetrahydrofuran (THF), combinations thereof and the like, at a concentration from about 0.001% to about 50%, in embodiments from about 0.01% to about 10%.

In embodiments, a nanoporous graphene/graphene oxide nanosheet is applied to a substrate, followed by application of a cross-linking agent, followed by application of at least one additional nanoporous graphene/graphene oxide nanosheet, so that the additive (here cross-linking agent) is between the nanosheets.

In accordance with the present disclosure, the interlayer spacing of assembled nanoporous graphene/graphene oxide nanosheets may also be adjusted. The spacing between nanoporous graphene (or graphene oxide) layers plays an important role in the separation process, since the flow of the permeate mainly takes place in the 2D channels between the nanoporous graphene (or graphene oxide) nanosheets. Therefore, in embodiments, the spacing between nanoporous graphene (or graphene oxide) sheets may be adjusted depending on different membrane applications, for example, whether the membrane is to be used for RO or nanofiltration.

Increasing the spacing between nanoporous graphene (or graphene oxide) sheets may be accomplished as follows. The enlargement of spacing between nanoporous graphene (or graphene oxide) sheets can be achieved with particles as additives. For example, the enlargement of spacing between nanoporous graphene (or graphene oxide) sheets can be achieved by sandwiching appropriate particles including molecules, nanoparticles, or polymers between nanoporous graphene (or graphene oxide) sheets, in order to increase or decrease the spacing as desired. Small molecules with functional groups, such as borate, ethylenediamine, epichlorohydrin, phosphorus oxychloride (phosphoryl chloride), trimetaphosphate, linear mixed anhydrides of acetic and di- or tribasic carboxlic acids, vinyl sulfone, diepoxides, cyanuric chloride, aldehydes (for example, formaldehyde, glutaraldehyde (GA), acetaldehyde, acrolein), 1,4-butanediol diglycidyl ether, glyoxal, glyoxylic acid, oxydisuccinic acid, citric acid, fumaric acid, combinations thereof, and the like, can be placed between layers of graphene (or graphene oxide) nanosheets and can form covalent bonds with the graphene (or graphene oxide) nanosheets, thereby adjusting the spacing between the nanosheets.

Other molecules, nanoparticles and/or polymers that may be placed between the nanoporous graphene (or graphene oxide) nanosheets include, for example, polyolefins including polyethylene and polypropylene, polysulfones such as polyethersulfone, fluoropolymers such as polyvinylidene fluoride, polyesters including polyethylene terephthalate, polytrimethylene terephthalate, and polybutylene terephthalate, polyamides including nylon 6, nylon 66, and nylon 12, polycarbonates, polystyrenes, polynitriles such as polyacrylonitrile, polyacrylates such as polymethyl methacrylate, polyacetates such as polyvinyl acetate, polyalcohols such as polyvinyl alcohol, polysaccharides (such as chitosan, cellulose, collagen, or gelatin), proteins such as chitin, hyaluronic acid, polyalkylene oxides such as polyethylene oxide and polyethylene glycol, polyurethanes, polyureas, polyvinyl chloride, polyimines such as polyethylene imine, polyvinylpyrrolidone, polyacrylic acids, polymethacrylic acids, polysiloxanes such as polydimethylsiloxane and polyhedral oligomeric silsesquioxane (POSS), poly(ester-co-glycol) copolymers, silica nanoparticles, carbon nanotubes, carbon nanofibers, poly(ether-co-amide) copolymers, crosslinked forms thereof, derivatives thereof and copolymers thereof. In some embodiments, poly(acrylonitrile) (PAN), polyethersulfone (PES), polyvinylidenefluoride (PVDF), crosslinked water soluble polymers, e.g., polyvinylalcohol (PVA), modified cellulose and modified chitosan, their chemical derivatives and/or copolymers, combinations thereof, and the like, may be used as additives. The amounts of these additives applied to the nanosheets will vary depending upon the intended use of the resulting membrane.

Similar to the application of cross-linking agents to the of nanoporous graphene/graphene oxide nanosheets, a nanoporous graphene/graphene oxide nanosheet is applied to a substrate, followed by application of an additive particle (and optional cross-linking agent), followed by application of at least one additional nanoporous graphene/graphene oxide nanosheet.

In embodiments, the spacing between nanoporous graphene (or graphene oxide) layers could be increased from about 0.3 nm to about 100 nm, in embodiments from about 0.5 nm to about 10 nm, in embodiments about 0.7 nm. As some spacings may only be large enough for the passage of water vapor, the spacing should be at least large enough for water passage in applications for desalination, for example. Polyelectrolytes and nanoparticles such as polyvinylamine and cellulose nanofibers can be used to obtain larger distances between nanoporous graphene (or graphene oxide) sheets. However, the sandwiched structure, built by a layer-by-layer assembly method, may have difficulties for scale up operation.

Decreasing the spacing between nanoporous graphene oxide layers can be carried out by partially reducing the nanoporous graphene oxide to nanoporous graphene. It may be difficult to decrease spacing between tightly packed pristine graphene layers, so only narrowing the spacing between graphene oxide layers may be an alternative. Tightly packed graphene oxide layers have the interspacing larger than tightly packed pure graphene layers, because of the functional groups on the graphene oxide surface, which can create more space between graphene oxide sheets. Therefore, the effective way to decrease the interspacing between nanoporous graphene oxide sheets could be to partially reduce the nanoporous graphene oxide.

In embodiments, different physical and chemical reducing approaches, such as high temperature treatment (>140° C.) under nitrogen atmosphere, and conducting the reduction reaction with hydrazine, could be used to reduce graphene oxide.

Membranes including the nanofibrous scaffold and barrier layer having more than one sheet of nanoporous graphene/graphene oxide thereon may have a permeate flux of from about 10 kg/m² hr to about 500 kg/m² hr, in embodiments from about 50 kg/m² hr to about 100 kg/m² hr. The membrane including the nanofibrous scaffold and nanoporous graphene oxide barrier layer thereon may have a separation factor from about 95% to about 99.9%, in embodiments from about 97.5% to about 99%.

The new class of nanocomposite membranes in accordance with the present disclosure, including cross-linked nanoporous graphene or graphene oxide barrier layers on a nanofibrous supporting scaffold, have high efficiency for nanofiltration, reverse osmosis (RO), forward osmosis (FO) and pervaporation. Two key factors for these uses include: (1) the pore sizes and porosity of nanoporous graphene or graphene oxide; and (2) the spacings between the graphene nanosheets as adjusted by cross-linking agent(s) or inclusion of particulate additives, which can also stabilize the nanoporous graphene-based sheets.

The advantages of the new class of graphene-based membranes, based on a nanoporous graphene (oxide) barrier layer and a supporting scaffold, include the following.

(1) Nanoporous graphene and graphene oxide nanosheets with adjustable pore sizes and porosity can be fabricated by oxidatively treating graphene or graphene oxide. The pore sizes can go down to 0.5 nm or lower to fit nanofiltration, desalination, and/or pervaporation applications. Nanoporous graphenes with relatively high surface porosity and 2D channels between the graphene sheets are used to permit water passage and for excluding other unwanted contaminants.

(2) The spacings between nanosheets can also be tuned by selecting different cross-linking reagents, such as boric acid, glutaraldehyde, and epichlorohydrin, to create channels, essentially just wide enough for water molecules to pass through.

(3) By the combination of nanoporous graphenes to short cut the water pathways, and chemical cross-linking to stabilize the nanoporous graphene sheets and to provide the proper spacing between the nanoporous graphene sheets, the graphene-based barrier layer, together with the nanofibrous composite substrate, can form a new separation membrane for nanofiltration, reverse osmosis (RO) (desalination) forward osmosis (FO) (energy generation) and pervaporation.

In accordance with the present disclosure, both nanopores on graphene sheets and nano-spacings between nanoporous graphene nanosheets can be used, respectively, as '1D' pores and 2D 'channels' for liquid water. Therefore, a new form of membrane with a very thin barrier layer thickness can be fabricated for further improvement of permeability and retention.

The following Examples are being submitted to illustrate embodiments of the present disclosure. These Examples are intended to be illustrative only and are not intended to limit the scope of the present disclosure. Also, parts and percentages are by weight unless otherwise indicated. As used herein, "room temperature" refers to a temperature of from about 20° C. to about 30° C.

Example 1

In accordance with the present disclosure, the fabrication of membranes using nanoporous graphene layers was carried out and the application of such membranes for water purification and pervaporation were demonstrated.

Graphene oxide nanosheets were prepared from graphite powder. About 2 grams of graphite powder and about 12 grams of $KMnO_4$ were added into 300 mL of $H_2SO_4$ and $H_3PO_4$ at a ratio of 9/1 (v/v). The reaction mixture was stirred at 50° C. for 12 hours. The resulting mixture was cooled down to room temperature and was mixed with 400 grams of ice and 2 mL of 30% $H_2O_2$. The graphite oxide was washed with water until neutral (pH 7). The suspension of graphene oxide (500 ppm) was obtained from graphite oxide with a sonication (homogenizer) treatment.

Example 2

Preparation of nanoporous graphene/graphene oxide nanosheets. Graphene/graphene oxide (commercially available materials) (100 mg) were dispersed into 100 mL $H_2O_2$ (30%) and the mixture was sonicated for 10 minutes at room temperature to achieve a homogenous dispersion. Then, the mixture was heated to 70° C. and kept at that temperature for 72 hours. (The time period can vary depending on the pore size and porosity desired.) After 72 hours, the mixture was dialyzed in water with a dialysis tube (MWCO: 15 kDa) for 3 days. The produced nanoporous graphene oxide had a pore size of about 3 nm to about 5 nm.

Example 3

Infrared spectrometer (Thermo Scientific, Nicolet iS10) was used to determine the IR spectra of the samples, as shown in FIG. 1. As seen in FIG. 1, the two peaks in the 1200 $cm^{-1}$ region were not expected to be present in the spectra since they did not correspond to any carbon to carbon bonds. They are most likely due to some organic impurities present in the original material. Many peaks in the spectrum of graphene oxide appeared, including the corresponding peaks of CO (1644 $cm^{-1}$), COOH (1746 $cm^{-1}$) and OH (3487 $cm^{-1}$), showing that the graphene sheets had been successfully oxidized to graphene oxide sheets.

Example 4

Thermal gravimetric analysis on the samples was carried out using a TGA system (Perkin Elmer, TGA 7) under the following conditions. The gas type was set to be air, with a flow rate of 20 ml/min. The initial temperature was set at 50° C. An isothermal scan was carried out by holding the temperature at 50° C. for 10 minutes and then the temperature scan was followed by raising the temperature to 800° C. with a raising rate of 10° C./min. The results are shown in FIG. 2.

Figure 2:
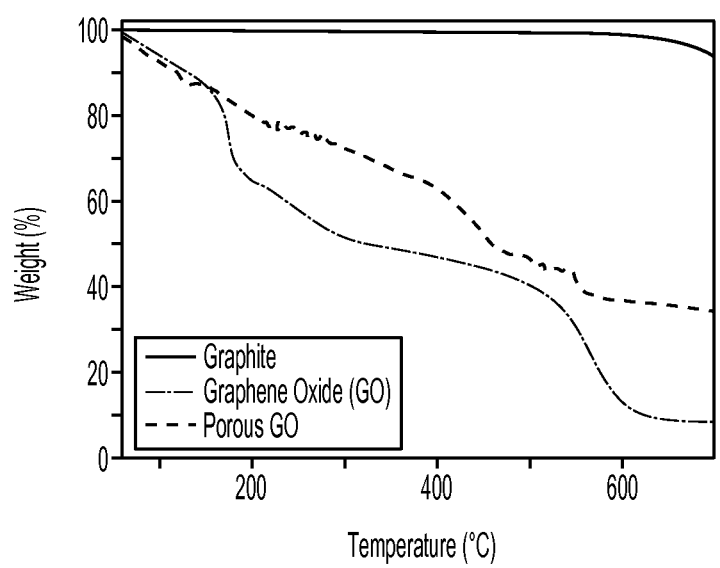
FIG. 2 is a graph of scans obtained by thermal gravimetric analysis on samples of graphite and graphene oxide produced in accordance with the present disclosure.

As can be seen in FIG. 2, compared with graphite, the thermal stability of graphene oxide (GO) and nanoporous GO decreased, due to the existence of hydroxyl, carboxyl, epoxy, and carbonyl groups generated from the oxidation of graphite with the oxidized system.

Example 5

Deposition of nanoporous graphene/graphene oxide layers on top of polymeric substrates. The vacuum filtration process was as follows. The nanoporous graphene/graphene oxide sheets were dispersed into water, with sonication used to facilitate this dispersion. Then, the graphene/graphene oxide suspension (typically, 5.0 ppm) was transferred into a vacuum filtration funnel, below which the polymeric substrate (GSWP0.22, Millipore) had been installed. A vacuum was applied underneath the substrate in order to drive the suspension in the funnel to flow, slowly and evenly, through the substrate. Since the pore size of the substrate was 0.22 microns, which was smaller than the size of nanoporous graphene/graphene oxide sheets, the graphene/graphene oxide sheets remained on the surface of the substrate. By controlling the concentration of the suspension (from 0.5 ppm to 5.0 ppm) and the filtration flow rate, the deposition thickness of nanosheets was controlled. In this example, it was of the order of 100 nm.

Example 6

Water purification is one of the potential applications of the membranes of the present disclosure. In this Example, a Millipore stainless steel (dead-end) cell (25 mm diameter) with an effective filtration area of 4.9 cm$^2$ was used for the filtration test for membranes including graphene oxide and nanoporous graphene oxide, as described in Example 2. The feeding solution had 0.02 μm particles (100 ppm) in water. During the filtration process, the feeding solution was pumped to circulate inside the system. The permeability and rejection were calculated by using the following equations:

$$P = \frac{\Delta V}{\Delta T \cdot \Delta P \cdot S} \quad (1)$$

Where ΔV is the permeate volume accumulated during a time interval Δt, S is the surface area of the membrane, and ΔP is the applied pressure across the membrane. The rejection ratio, R, is $$R\% = \frac{C_{feed} - C_{permeate}}{C_{feed}} \times 100\% \quad (2)$$

Where Cfeed and Cpermeate are the concentrations of the feed solution and the permeate solution, respectively.

The filtration results are listed in Table 1 below. The flux of the nanoporous graphene oxide-based membrane was about 2 times higher than that of the graphene oxide-based membrane, while the rejection ratios remained the same.

TABLE 1

Filtration performance of membranes with a graphene oxide- and a nanoporous graphene oxide-based barrier layer.

| Membranes | Flux (L/m2h/psi) | Rejection ratio (%) |
|---|---|---|
| GO | 1.4 | 99.9 |
| Porous GO | 3.6 | 99.9 |

Example 7

Spin-coating is another approach for deposition of nanoporous graphene/graphene oxide nano-sheets for demonstration purposes. A suspension of nanoporous graphene/graphene oxide (500 ppm) was prepared before spin-coating. The polymeric substrate was taped onto the rotating plate of the spin-coating machine. The spinning speed was set at about 3000 rpm. About 1 mL of the suspension was dropped onto the center of the spinning substrate. After the droplet was spread on the substrate, the above steps were repeated 3 times. The centrifugal force produced by spin-coating and the quick evaporation of water facilitated an ordered assembly of the nanoporous graphene/graphene oxide nanosheets.

It will be understood that various modifications may be made to the embodiments disclosed herein. Therefore, the above description should not be construed as limiting, but merely as an exemplification of preferred embodiments. Those skilled in the art will envision other modifications within the scope and spirit of the present disclosure. Such modifications and variations are intended to come within the scope of the following claims.

What is claimed is:

1. An article comprising:
   a nanofibrous scaffold;
   at least a first layer of nanoporous graphene, nanoporous graphene oxide, or combinations thereof on at least a portion of a surface of the nanofibrous scaffold;
   an additive selected from the group consisting of cross-linking agents and particles on an outer surface of the at least first layer of nanoporous graphene, nanoporous graphene oxide, or combinations thereof; and
   at least a second layer of nanoporous graphene, nanoporous graphene oxide, or combinations thereof on at least a portion of the surface of the first layer of nanoporous graphene, nanoporous graphene oxide, or combinations thereof, such that the additive is between the first and second layers of nanoporous graphene, nanoporous graphene oxide, or combinations thereof,
   wherein the article has a permeate flux from about 10 kg/m$^2$ hr to about 500 kg/m$^2$ hr.

2. The article of claim 1, wherein the nanofibrous scaffold comprises a polymer selected from the group consisting of polyolefins, polysulfones, fluoropolymers, polyesters, polyamides, polycarbonates, polystyrenes, polynitriles, polyacrylates, polyacetates, polyalcohols, polysaccharides, proteins, polyalkylene oxides, polyurethanes, polyureas, polyimines, polyacrylic acids, polymethacrylic acids, polysiloxanes, poly(ester-co-glycol) copolymers, poly(ether-co-amide) copolymers, derivatives thereof and copolymers thereof.

3. The article of claim 1, wherein the nanofibrous scaffold comprises a polymer selected from the group consisting of polyethylene, polypropylene, polyethersulfone, polyvinylidene fluoride, polyethylene terephthalate, polytrimethylene terephthalate, polybutylene terephthalate, nylon 6, nylon 66, nylon 12, polystyrene, polyacrylonitrile, polymethyl methacrylate, polyvinyl acetate, polyvinyl alcohol, chitosan, cellulose, collagen, gelatin, polyethylene oxide, polyethylene glycol, polyvinyl chloride, polyethylene imine, polyvinylpyrrolidone, polydimethylsiloxane, derivatives thereof and copolymers thereof.

4. The article of claim 1, wherein the nanofibrous scaffold has a thickness of from about 1 μm to about 500 μm.

5. The article of claim 1, wherein the nanofibrous scaffold has voids possessing a diameter from about 10 nm to about 200 μm.

6. The article of claim 1, wherein the first layer, the second layer, or both, may have a thickness from about 10 nm to about 1000 nm.

7. The article of claim 1, wherein the first layer, the second layer, or both, may possess pores having an average diameter from about 1 nm to about 1000 nm.

8. The article of claim 1, wherein the first layer, the second layer, or both, have a mean surface porosity from about 10% to about 70%.

9. The article of claim 1, wherein the cross-linking agent is selected from the group consisting of boric acid, ethylenediamine, butylenediamine, p-phenylenediamine, glutaraldehyde, epichlorohydrin, phosphorus oxychloride, trimetaphosphate, linear mixed anhydrides of acetic and di- or tribasic carboxlic acids, vinyl sulfone, diepoxides, cyanuric chloride, aldehydes, formaldehyde, acetaldehyde, acrolein, 1,4-butanediol diglycidyl ether, glyoxal, glyoxylic acid, oxydisuccinic acid, citric acid, fumaric acid, and combinations thereof.

10. The article of claim 1, wherein the particles are selected from the group consisting of cellulose nanofibers, polyhedral oligomeric silsesquioxane, silica nanoparticles, carbon nanotubes, carbon nanofibers, and combinations thereof.

11. The article of claim 1, wherein the spacing between the first layer and the second layer is from about 0.3 nm to about 100 nm.

12. An article comprising:
a nanofibrous scaffold;
at least a first layer of nanoporous graphene, nanoporous graphene oxide, or combinations thereof on at least a portion of a surface of the nanofibrous scaffold, the first layer possessing pores having an average diameter from about 1 nm to about 1000 nm;
an additive selected from the group consisting of cross-linking agents and particles on an outer surface of the at least first layer of nanoporous graphene, nanoporous graphene oxide, or combinations thereof; and
at least a second layer of nanoporous graphene, nanoporous graphene oxide, or combinations thereof on at least a portion of the surface of the first layer of nanoporous graphene, nanoporous graphene oxide, or combinations thereof, the second layer possessing pores having an average diameter from about 1 nm to about 1000 nm,
wherein the additive is between the first and second layers of nanoporous graphene, nanoporous graphene oxide, or combinations thereof, and
wherein the article has a permeate flux from about 10 $kg/m^2$ hr to about 500 $kg/m^2$ hr.

13. The article of claim 12, wherein the nanofibrous scaffold comprises a polymer selected from the group consisting of polyolefins, polysulfones, fluoropolymers, polyesters, polyamides, polycarbonates, polystyrenes, polynitriles, polyacrylates, polyacetates, polyalcohols, polysaccharides, proteins, polyalkylene oxides, polyurethanes, polyureas, polyimines, polyacrylic acids, polymethacrylic acids, polysiloxanes, poly(ester-co-glycol) copolymers, poly(ether-co-amide) copolymers, derivatives thereof and copolymers thereof.

14. The article of claim 12, wherein the nanofibrous scaffold comprises a polymer selected from the group consisting of polyethylene, polypropylene, polyethersulfone, polyvinylidene fluoride, polyethylene terephthalate, polytrimethylene terephthalate, polybutylene terephthalate, nylon 6, nylon 66, nylon 12, polystyrene, polyacrylonitrile, polymethyl methacrylate, polyvinyl acetate, polyvinyl alcohol, chitosan, cellulose, collagen, gelatin, polyethylene oxide, polyethylene glycol, polyvinyl chloride, polyethylene imine, polyvinylpyrrolidone, polydimethylsiloxane, derivatives thereof and copolymers thereof.

15. The article of claim 12, wherein the nanofibrous scaffold has a thickness of from about 1 µm to about 500 µm.

16. The article of claim 12, wherein the nanofibrous scaffold has voids possessing a diameter from about 10 nm to about 200 µm.

17. The article of claim 12, wherein the first layer, the second layer, or both, may have a thickness from about 10 nm to about 1000 nm.

18. The article of claim 12, wherein the first layer, the second layer, or both, have a mean surface porosity from about 10% to about 70%.

19. The article of claim 12, wherein the cross-linking agent is selected from the group consisting of boric acid, ethylenediamine, butylenediamine, p-phenylenediamine, glutaraldehyde, epichlorohydrin, phosphorus oxychloride, trimetaphosphate, linear mixed anhydrides of acetic and di- or tribasic carboxlic acids, vinyl sulfone, diepoxides, cyanuric chloride, aldehydes, formaldehyde, acetaldehyde, acrolein, 1,4-butanediol diglycidyl ether, glyoxal, glyoxylic acid, oxydisuccinic acid, citric acid, fumaric acid, and combinations thereof.

20. The article of claim 12, wherein the particles are selected from the group consisting of cellulose nanofibers, polyhedral oligomeric silsesquioxane, silica nanoparticles, carbon nanotubes, carbon nanofibers, and combinations thereof.

21. The article of claim 12, wherein the spacing between the first layer and the second layer is from about 0.3 nm to about 100 nm.

* * * * *